United States Patent
Aboagye et al.

(10) Patent No.: US 11,121,776 B2
(45) Date of Patent: Sep. 14, 2021

(54) FACEPLATE PLUGGABLE REMOTE LASER SOURCE AND SYSTEM INCORPORATING SAME

(71) Applicant: ROCKLEY PHOTONICS LIMITED, Oxford (GB)

(72) Inventors: Steve Akwaa Aboagye, Campbell, CA (US); David Arlo Nelson, Fort Collins, CO (US); Cyriel Johan Agnes Minkenberg, Neuheim (CH); Rajagopal Krishnaswamy, Saratoga, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/988,377

(22) Filed: Aug. 7, 2020

(65) Prior Publication Data

US 2021/0044356 A1    Feb. 11, 2021

Related U.S. Application Data

(60) Provisional application No. 62/884,617, filed on Aug. 8, 2019.

(51) Int. Cl.
*H04B 10/50* (2013.01)
*G02B 6/42* (2006.01)

(52) U.S. Cl.
CPC .......... *H04B 10/503* (2013.01); *G02B 6/423* (2013.01); *G02B 6/4292* (2013.01)

(58) Field of Classification Search
CPC ..... H04B 10/503; G02B 6/423; G02B 6/4292
(Continued)

(56) References Cited

U.S. PATENT DOCUMENTS 6,769,812 B1    8/2004    Handforth et al.
8,168,939 B2    5/2012    Mack et al.
(Continued)

FOREIGN PATENT DOCUMENTS

CN    208937753 U    6/2019
EP    0 537 409 A2    4/1993

OTHER PUBLICATIONS

International Search Report and Written Opinion of the International Searching Authority, dated Oct. 26, 2018, Corresponding to PCT/IB2018/000459, 15 pages.
(Continued)

*Primary Examiner* — Dalzid E Singh
(74) *Attorney, Agent, or Firm* — Lewis Roca Rothgerber Christie LLP

(57) ABSTRACT

A faceplate pluggable remote laser source and system incorporating such a laser source. The system may include an enclosure having a faceplate; a first optical connector, in the faceplate; a laser module; and a loopback fiber cable, connected between the laser module and the first optical connector. The faceplate may form an exterior boundary of the enclosure. The laser module may have a first end including an electrical interface, and a second end including an optical interface. The first end of the laser module may be engaged in a receptacle in the faceplate, and the second end of the laser module may extend outside the faceplate. The laser module may be configured to receive electrical power through the electrical interface, and to produce unmodulated light at the optical interface. The loopback fiber cable and the first optical connector may be configured to route the unmodulated light back into the enclosure.

14 Claims, 7 Drawing Sheets

(58) Field of Classification Search
USPC .......................................................... 398/200
See application file for complete search history.

(56) References Cited

U.S. PATENT DOCUMENTS

| | | | |
|---|---|---|---|
| 8,772,704 B2 | 7/2014 | Mack et al. | |
| 8,831,437 B2 | 9/2014 | Dobbelaere et al. | |
| 9,876,329 B2 | 1/2018 | Raz et al. | |
| 10,404,035 B2 | 9/2019 | Schrans et al. | |
| 10,623,101 B1* | 4/2020 | Morris | G02B 6/4284 |
| 2003/0011845 A1 | 1/2003 | Billet et al. | |
| 2009/0116848 A1* | 5/2009 | Kim | H03M 5/12 398/140 |
| 2014/0334812 A1 | 11/2014 | Noguchi | |
| 2015/0155945 A1 | 6/2015 | Urino et al. | |
| 2016/0072602 A1* | 3/2016 | Earl | H04J 3/0697 709/248 |
| 2017/0117966 A1* | 4/2017 | Rickman | H04Q 11/00 |
| 2018/0006727 A1 | 1/2018 | Young et al. | |
| 2018/0109348 A1* | 4/2018 | Salsi | H04J 14/0202 |
| 2018/0335577 A1* | 11/2018 | Wong | G02B 6/3825 |
| 2019/0086618 A1* | 3/2019 | Shastri | H01S 5/02469 |

OTHER PUBLICATIONS

Invitation to Pay Fees and Partial International Search, dated Aug. 28, 2018, corresponding to PCT/IB2018/000459, 13 pages.

Minkenberg, C. et al., "Reimagining Datacenter Topologies With Integrated Silicon Photonics", Journal of Optical Communications and Networking, Jul. 2018, pp. B126-B139, vol. 10, No. 7, Optical Society of America.

U.S. Office Action from U.S. Appl. No. 15/946,345, dated Dec. 26, 2018, 11 pages.

Zilkie, A. J. et al., "Multi-micron silicon photonics platform for highly manufacturable and versatile photonic integrated circuits", IEEE Journal of Selected Topics in Quantum Electronics, Sep.-Oct. 2019, pp. 1-14, vol. 25, No. 5, IEEE.

International Search Report and Written Opinion of the International Searching Authority, dated Nov. 13, 2020, Corresponding to PCT/EP2020/072283, 13 pages.

* cited by examiner

FACEPLATE PLUGGABLE REMOTE LASER SOURCE AND SYSTEM INCORPORATING SAME

CROSS-REFERENCE TO RELATED APPLICATION(S)

The present application claims priority to and the benefit of U.S. Provisional Application No. 62/884,617, filed Aug. 8, 2019, entitled "CPO SWITCH FACEPLATE PLUGGABLE REMOTE LIGHT SOURCE CONCEPT AND METHOD OF INTEGRATION" the entire content of which is incorporated herein by reference.

FIELD

One or more aspects of embodiments according to the present disclosure relate to opto-electronic systems, and more particularly to a faceplate pluggable remote laser source.

BACKGROUND

In an electro-optical switching system, one or more external modulators may be used to modulate unmodulated laser light with data. Such a modulator may receive the unmodulated light from a laser which may be integrated in a package with the modulator, or which may be in a separate package, optically connected through a fiber to the package housing the modulator. It may be advantageous for a remote laser to be installed in the faceplate of a rack mount enclosure so that a failed remote laser may be readily replaced and so that a remote laser is located in a more thermally favorable environment, thus improving laser efficiency and reliability.

Thus, there is a need for a faceplate pluggable remote laser source.

SUMMARY

According to an embodiment of the present invention, there is provided a system, including: an enclosure having a faceplate; a first optical connector, in the faceplate; a laser module; and a loopback fiber cable, connected between the laser module and the first optical connector, the faceplate forming an exterior boundary of the enclosure, the laser module having a first end including an electrical interface, and a second end including an optical interface, the first end of the laser module being engaged in a receptacle in the faceplate, the second end of the laser module extending outside the faceplate, the laser module being configured to receive electrical power through the electrical interface, and to produce unmodulated light at the optical interface, the loopback fiber cable and the first optical connector being configured to route the unmodulated light back into the enclosure.

In some embodiments, the laser module has a QSFP-DD form factor.

In some embodiments, the first optical connector is a Multi-fiber Push On connector.

In some embodiments, the optical interface of the laser module includes a second optical connector, the second optical connector being a Multi-fiber Push On connector.

In some embodiments, the loopback fiber cable includes an optical fiber, the optical fiber not being polarization-preserving fiber.

In some embodiments, the system includes an optical-electronic switch module in the enclosure, the optical-electronic switch module including a plurality of optical engines, each of the optical engines being configured: to convert optical data signals to electrical data signals, and to convert electrical data signals to optical data signals.

In some embodiments, the laser module includes a laser, and wherein the system includes an optical path from the laser of the laser module to an optical modulator of an optical engine of the plurality of optical engines, the optical path lacking an optical isolator.

In some embodiments, an optical fiber path between the optical-electronic switch module and the faceplate includes an optical connector, inside the enclosure.

In some embodiments, a plurality of optical fiber paths, including the optical fiber path, between the optical-electronic switch module and the faceplate include a shared optical connector.

In some embodiments, wherein the optical-electronic switch module is rectangular, and the optical-electronic switch module is oblique to the enclosure.

In some embodiments, the optical-electronic switch module is at an angle of about 45 degrees relative to the enclosure.

In some embodiments, the laser module includes a control circuit, including: a circuit for supplying a drive current to a laser of the laser module, an amplifier for amplifying a signal from a monitoring photodiode in the laser module, a temperature sensing circuit, a built-in self-test circuit, and a microcontroller.

According to an embodiment of the present invention, there is provided a laser module, including: a plurality of lasers, the laser module having a QSFP-DD form factor, with a first end including an electrical interface, and a second end including an optical interface, the optical interface including a plurality of fibers, the laser module being configured to supply unmodulated light through a first fiber of the plurality of fibers.

In some embodiments, the optical interface includes a Multi-fiber Push On connector including the plurality of fibers.

In some embodiments, the plurality of fibers includes 32 fibers, and wherein the laser module is configured to supply unmodulated light through each of the 32 fibers.

In some embodiments, the laser module is configured to supply, at the optical interface: unmodulated light at a first wavelength at the first fiber of the optical interface, and unmodulated light at a second wavelength at a second fiber of the optical interface, the second wavelength differing from the first wavelength by at least 0.1 nm.

In some embodiments, the second wavelength differs from the first wavelength by at least 6 nm.

According to an embodiment of the present invention, there is provided a system, including: an enclosure having a faceplate; an optical-electronic switch module in the enclosure; and a plurality of laser modules connected to the optical-electronic switch module through optical fibers, wherein the optical-electronic switch module includes: a switch integrated circuit; and a plurality of optical engines, co-packaged with the switch integrated circuit, and wherein a first optical engine of the plurality of optical engines is configured: to convert optical data signals to electrical data signals; and to convert electrical data signals to optical data signals, using light from a first laser module of the plurality of laser modules.

In some embodiments, the optical-electronic switch module further includes a plurality of fiber cables for receiving optical data signals, for receiving unmodulated light, and for transmitting optical data signals, each of the fiber cables including a plurality of optical fibers, and each of the fiber cables terminating in a fiber connector, the system further including a mid-board connector in the enclosure for connecting a plurality of the fiber cables of the optical-electronic switch module to a plurality of fiber cables extending to the faceplate.

In some embodiments, the system further includes: a first optical connector in the faceplate; and a loopback fiber cable, wherein: a first end of the first laser module is engaged in a receptacle in the faceplate; a second end of the first laser module extends outside the faceplate; the first laser module is configured to produce unmodulated light at the second end of the first laser module; and the loopback fiber cable and the first optical connector are configured to route the unmodulated light back into the enclosure.

In some embodiments, the system further includes: a first optical connector in the faceplate; and a first electrical connector in the faceplate, wherein: a first end of the first laser module includes: a second electrical connector engaged with the first electrical connector, and a second optical connector engaged with the first optical connector; and the first laser module is configured to: receive electrical power through the second electrical connector, and transmit unmodulated light through the second optical connector.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a faceplate pluggable remote laser source provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
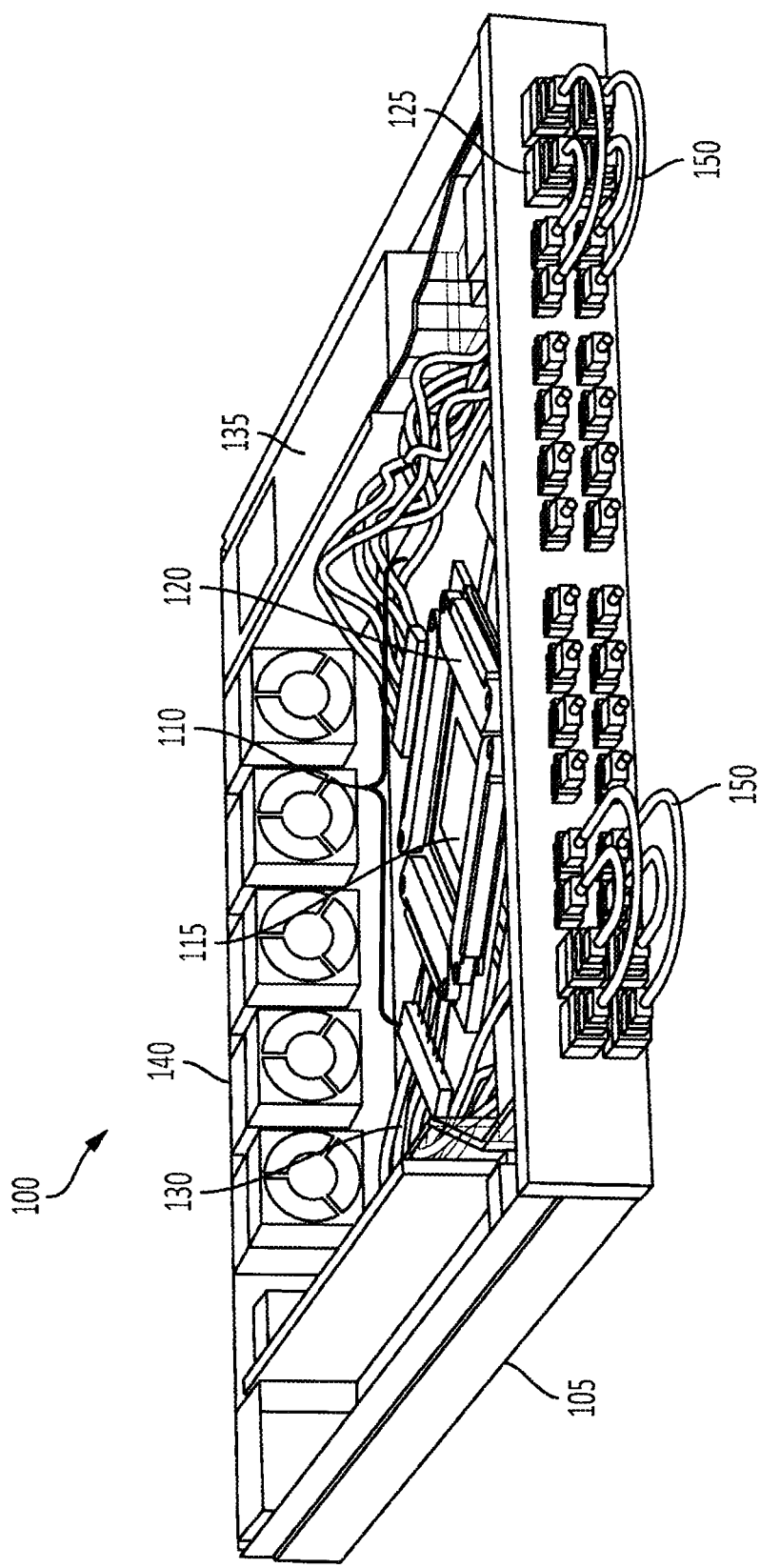
FIG. 1 is a perspective view of a chassis, according to an embodiment of the present disclosure.

In some embodiments a co-packaged optics (CPO) solution is based on an optical engine technology, a laser module, and a CPO switch module packaging concept in a switch rack-mount chassis, or "switch box". Referring to FIG. 1, the chassis 100 may include (e.g., consist of) an enclosure 105, and, within or connected to the enclosure 105, (i) an optical-electronic switch module (or "CPO switch module") 110 including an electronic switch circuit 115 (e.g., a CMOS integrated circuit which may be an application specific integrated circuit (ASIC)), (ii) a plurality of optical engines 120 (obscured in FIG. 1 by mechanical elements of the optical-electronic switch module 110), (iii) a plurality of laser modules 125 (which may be plugged into receptacles in a wall of the enclosure 105), (iv) an optical cable assembly 130, including one or more fiber bundles and one or more connectors, and (v) other components, such as a power supply 135, cooling fans 140, and a motherboard 145 (on which the optical-electronic switch module 110 may be installed). Each optical engine 120 may perform electrical to optical conversions or optical to electrical conversions, or both, and it may also perform various electrical signal processing functions such as clock and data recovery, serializing, deserializing, encoding or decoding with error correction codes, and the like. Each optical engine 120 may include photonic integrated circuits (PICs) implemented in a silicon photonics platform. The PICs may incorporate optical devices, such as photodetectors (e.g., monolithic Ge photodetectors), optical modulators (e.g., hybrid-integrated InP electro-absorption modulators), silicon-photonic wavelength multiplexers and demultiplexers, and silicon-photonic spot size convertors (or "mode converters"), and V-grooves for fiber attachment. Each optical engine 120 may be compliant with the 400GBASE-FR4 physical medium dependent sublayer (PMD) specification. Each optical engine 120 may include electrical integrated circuits (or "interface circuits") to interface the optics with the switch ASIC (or "switch integrated circuit").

In operation, each optical modulator in an optical engine 120 may receive (i) unmodulated light from a laser module 125 (described in further detail below) and (ii) an electrical drive signal (produced by an interface circuit, based on an electrical data signal received by the interface circuit), and it may produce an optical data signal (i.e., modulated light). Each photodetector may receive modulated light (i.e., an optical data signal) and, together with an interface circuit (which may include a transimpedance amplifier), it may produce an electrical data signal. The interface circuits may be implemented either in BiCMOS or in CMOS and implement XSR compliant electrical interfaces. The optical engines 120 may be fabricated using 3D packaging techniques to achieve high density and high performance. Each optical engine 120 may be connectorized, e.g., (i) connected, through an electrical connector of the optical engine 120, to the motherboard 145 or other substrate on which the switch ASIC is installed in to order to avoid the need for soldering the optical engine 120 and facilitate reworking, servicing, and field installation, or (ii) connected by optical fiber connectors to the laser module 125 and to optical fibers carrying incoming or outgoing data.

Figure 4:
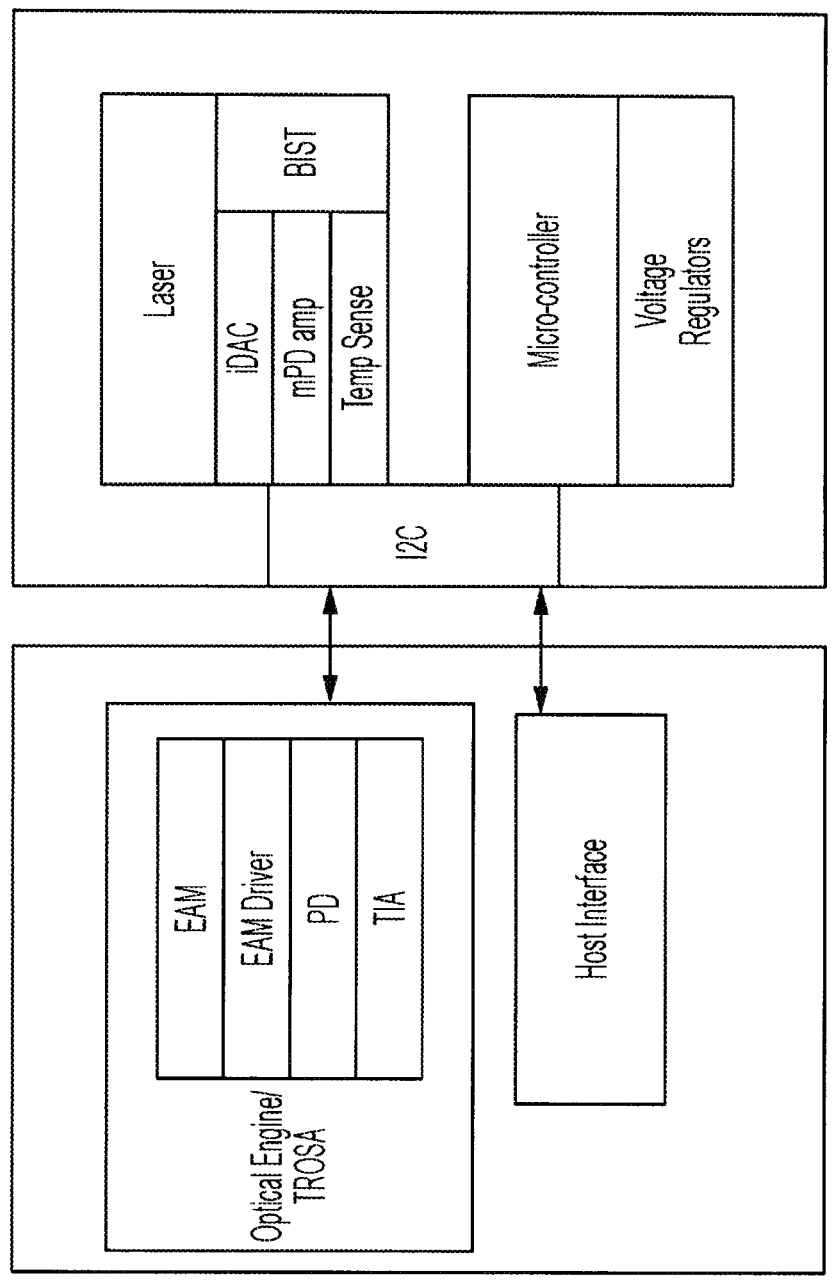
FIG. 4 is a block diagram, according to an embodiment of the present disclosure.

Optical power may be supplied to the optical engines 120 by laser modules 125 fulfilling the role of remote laser sources and additionally incorporating control and management functionality. An interface (e.g., an interface (e.g., an I2C or SPI interface) using a protocol documented, for example, in the SFF-8636 specification, published by the Storage Networking Industry Association, and available from members.snia.org/document/dl/26713) may be used for communication between a system-level control CPU (which may be installed on the motherboard 145) and control integrated circuits in the laser modules 125 (each of which may be connected to a respective optical engine 120, as discussed in further detail below). Communications between the control CPU and any one of the optical engines 120 may be relayed by the corresponding control integrated circuit in a laser module 125 via an interface (e.g., an I2C interface, as shown in FIG. 4) between the optical engine 120 and the control integrated circuit in the laser module 125. In some embodiments, the only connection between an optical engine 120 and the control CPU is through an I2C connection between the optical engine 120 and the laser module 125. The laser modules 125 may be packaged in a faceplate-pluggable multi-source agreement (MSA) form factor (QSFP-DD) to provide easy laser field serviceability and a more favorable thermal environment for the lasers compared to integrated lasers (the temperature at the front of the enclosure 105, i.e., just inside the faceplate (which may be one exterior wall, or exterior "boundary" of the enclosure 105), being, e.g., 15° C. to 20° C. lower than the temperature at the rear of the enclosure 105, i.e., just in front of the cooling fans).

The packaging concept of FIG. 1 may include a 1RU chassis based on a 51.2 Tbps ASIC. The optical-electronic switch module 110 is located in the middle of the enclosure 105, at a 45-degree angle; it includes sixteen 3.2-Tbps optical engines 120 installed around the perimeter of the optical-electronic switch module 110. The optical-electronic switch module 110 includes, as shown in FIG. 1, an electronic switch ASIC (e.g., a CMOS packet-switching ASIC), and a plurality of optical engines 120. In operation, the optical engines 120 convert (as mentioned above) received optical data signals (received from outside the enclosure 105) to electrical data signals. The electrical data signals are processed (e.g., switched or routed) by the electronic switch ASIC, and the processed electrical data signals produced by the electronic switch ASIC are converted (by the optical engines 120) to optical data signals (which are sent out of the enclosure 105). As mentioned above, the conversion from electrical data signals to optical data signals may be performed (in the optical engines 120) by modulating light received from the laser modules 125. In some embodiments, the chassis 100 includes eight laser modules 125, each serving two engines. Four of the eight laser modules 125 may be installed in four respective receptacles at the left end of the faceplate and four of the eight laser modules 125 may be installed in four respective receptacles at the right end of the faceplate, as shown. Patch cables loop the output fibers of the laser modules 125 back into the enclosure 105, as optical power supply inputs, via a corresponding set of Multi-fiber Push On (MPO) bulkhead connectors, as shown. The optical signals of the 128 switch ports (each being a 400 Gbps switch port) are available through 16 MPO-16 connectors arranged in the middle of the faceplate. In some embodiments, the optical-electronic switch module 110 comprises 16 optical engines 120 each providing 3.2 Tbps of full-duplex capacity by means of 32 channels of 100 Gbps PAM-4. The system may be compliant with 400GBASE-FR4 optical interfaces; in some embodiments 400GBASE-DR4 is realized instead. The latter may use a different connector arrangement of the optical data ports, because it includes four times as many fibers.

In some embodiments, the 51.2 Tbps (or "51.2 T") switch has 128 ports (each being a 400G-FR4 port), and as such it may have a total of 256 signal fibers, one transmit fiber per port and one receive fiber per port, with four (wavelength division multiplexed WDM, e.g., coarse WDM (CDWM) or dense WDM (DWDM)) channels per fiber. The switch's optical 400 Gbps data ports are connectorized at the faceplate by means of sixteen MPO-16 multi-fiber connectors.

As such, eight ports may share a single connector. To connectorize each four-channel port separately, the fiber bundles from the faceplate may be broken out at an additional patch panel to expose 128 individual 400-Gbps ports. In some cases it may be possible to route the eight 400G ports in an aggregated bundle, and individual breakout may not be required. The chassis also has mid-board fiber-to-fiber connectors that directly connect the fiber ribbon pigtails from the optical engines 120 into fiber cables that are routed to the faceplate MPO connectors (through which modulated light propagates into and out of the enclosure 105, and through which unmodulated laser light propagates, from the laser modules 125, into the chassis). The chassis includes 32 fiber cables inside the enclosure 105. In some embodiments, MPO connectors are used for these mid-board connectors as well. Fiber management is described in more detail below.

Figure 2:
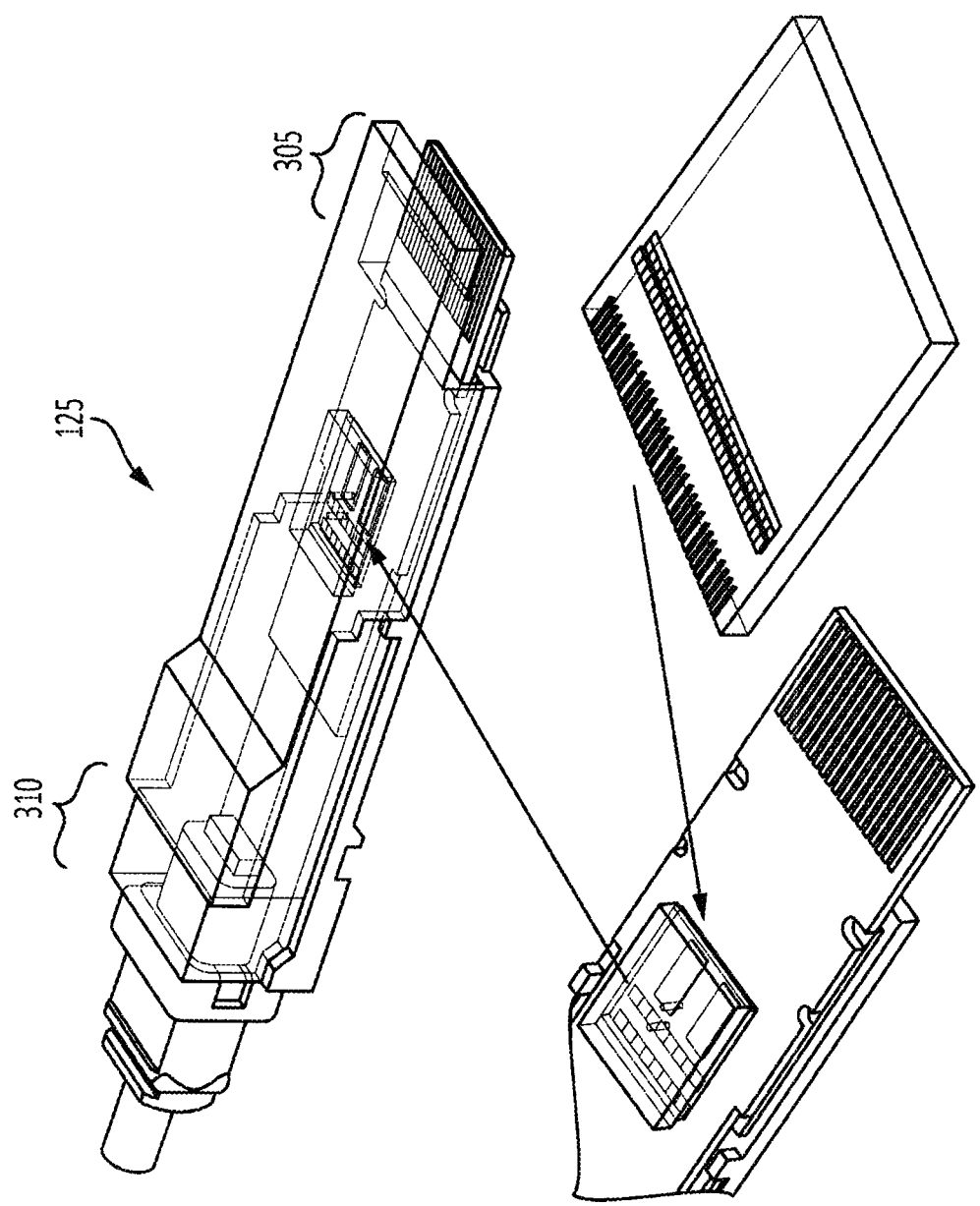
FIG. 2 is a perspective view of a laser module, including two internal views, according to an embodiment of the present disclosure.

Referring to FIG. 2, in some embodiments, the laser modules 125 are pluggable laser modules having a standard QSFP-DD form factor. This makes possible their installation in the faceplate of the enclosure 105, and enables field serviceability and providing a low temperature environment (relative to the interior of the enclosure 105) for the lasers, to maximize reliability. Each laser module 125 may have a first end with an electrical interface 350 (e.g., an electrical connector) and a second end having an optical interface 310 (e.g., an optical connector (e.g., an MPO connector) or two optical connectors (e.g., two MPO connectors)). Each laser module 125 may be plugged into (or "engaged in") a QSFP-DD receptacle (e.g., the electrical connector of the laser module 125 may be engaged in the receptacle), that is in (i.e., extends through) the faceplate. In some embodiments, one or more of the laser modules 125 has an OSFP form factor instead. In some embodiments the optical connector and the electrical connector are both on the same end of the laser module 125, and configured to engage with a pair of corresponding connectors positioned together (or integrated together) on the faceplate. In such an embodiment the form factor of the laser module 125 may differ from, e.g., QSFP-DD in some respects, to accommodate the modified connector configuration. Such an embodiment may use less faceplate real estate and reduce the risk of operator exposure to laser light during servicing.

The laser modules 125 may be coupled to the optical engines 120 using single-mode fiber (SMF28). In some embodiments, the single mode fiber may be polarization maintaining, specifically when the transmit PIC comprises polarization dependent elements. The chassis may include eight laser modules 125, each supplying optical power to two optical engines 120 (so that each laser module 125 supplies unmodulated light for a total of 64 channels). Each transmit PIC (in an optical engine 120) may implement a 1:2 optical power split, and each laser module 125 may have 32 fibers, which are connected to one MPO-32 connector on the faceplate. Each laser module 125 also includes two control integrated circuits (control ICs) (one for reach optical engine) that implement the control, management, and test interfaces to the lasers and optics. For example, as shown in FIG. 4, each control integrated circuit may include (i) a circuit (e.g., a digital to analog converter with a current source output (iDAC)) for supplying a drive current to a laser of the laser module 125, (ii) an amplifier (or "mPD amp") (e.g., a transimpedance amplifier) for amplifying a signal from a monitoring photodiode in the laser module 125, (iii) a temperature sensing (or "Temp Sense") circuit, (iv) a built-in self-test (BIST) circuit, (v) a microcontroller and (vi) one or more voltage regulators. Electrical power, and low-speed electrical connections (e.g., I2C connections)

may be routed (from the power supply 135 and from the optical engines 120, respectively) to the laser module 125 through the motherboard 145 and through the electrical interface at the first end of the laser module 125. FIG. 4 also shows the host interface (e.g., the interface to the control CPU), and a block diagram of an optical engine 120, in some embodiments, the optical engine 120 including an electro-absorption modulator (EAM), a driver circuit for the electro-absorption modulator, a photodetector (PD) (e.g., a photo-diode), a transimpedance amplifier (TIA) for amplifying the output of the photodetector, and a host interface circuit.

Figure 3:
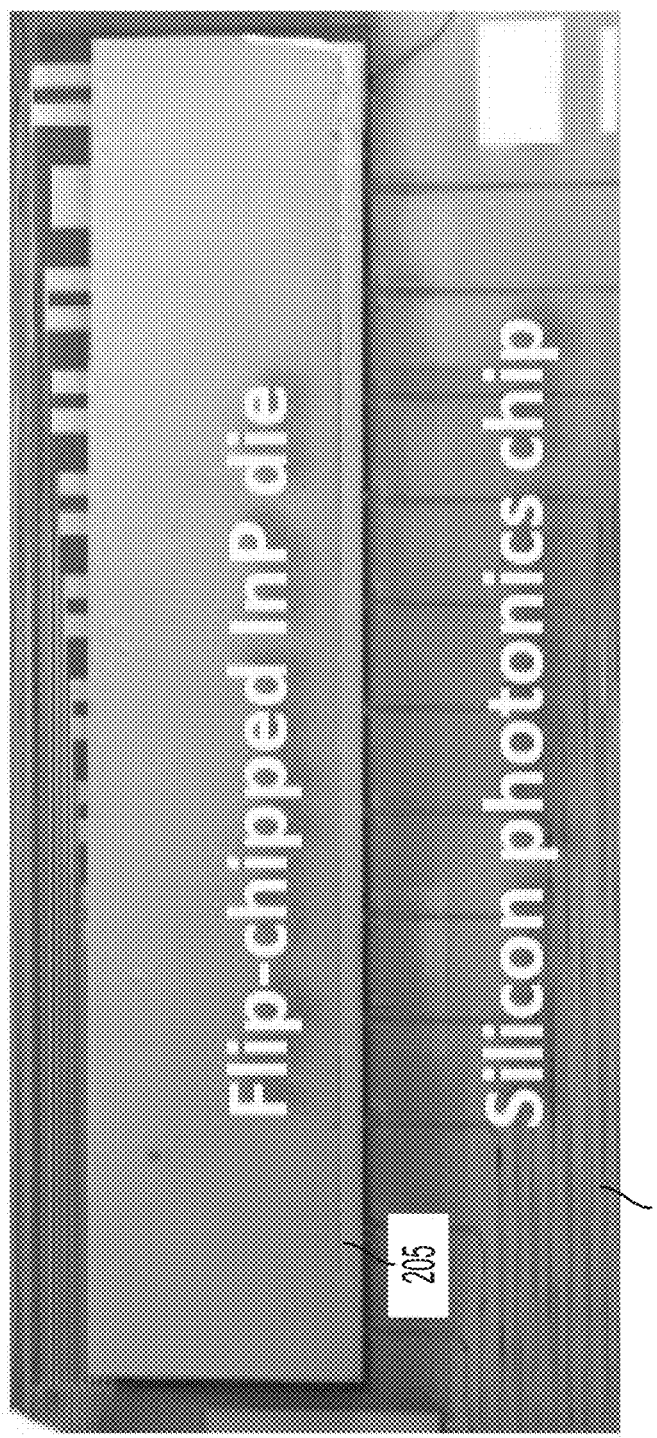
FIG. 3 is a micrograph of a flip-chipped laser die on a silicon photonics chip, according to an embodiment of the present disclosure.

Each laser module 125 may be constructed using hybrid integrated distributed feedback lasers (DFBs), assembled using multi-die DFB laser integration. These distributed feedback lasers may generate the different wavelengths required for CWDM (or for DWDM), by performing multi-die DFB laser integration. The integration technology is illustrated in FIG. 3 which shows an example of a hybrid laser chip 205 comprising a single InP die flip-chipped onto a silicon photonics (SiPh) photonic integrated circuit (PIC) 210. As mentioned above, the PIC may include mode converters (e.g., tapered waveguides) each of which may be configured to convert a first transverse optical mode, produced by a laser, to a second transverse optical mode suitable for launching light into a single-mode optical fiber. The PIC may also include an array of V-grooves for passively aligning an array of such fibers to respective waveguides on the PIC 210. The distributed feedback lasers may have mode-hop-free operation and high back-reflection tolerance.

In some embodiments, a multi-micron waveguide platform facilitates high-throughput passive alignment of fully processed and tested III-V device dies, implemented with commercial high-accuracy and high-throughput die bonders at both die and wafer level. This results in a low-cost, reliable, on-chip laser, suitable for high volume manufacturing. In such an approach, direct edge-coupling may provide a good mode match for efficient coupling to 3 μm waveguides with 2D passive alignment. Further, low-cost non-hermetic packaging may be employed, and good thermal performance may be achieved, due to direct heat sinking of the III-V device dies to the silicon substrate of the silicon PIC. In some embodiments, no optical isolator or coupling lenses are employed, resulting in a simple optical train.

The laser module 125 may fulfil two principal roles: it may (i) provide optical power, and it may (ii) implement control and management functions. The laser module 125 may be faceplate pluggable and it may have a QSFP-DD form factor, making it easily serviceable in the field. Each laser module 125 may serve two optical engines: it may provide 16 channels per optical engine 120, which are split 1:2 at the engine's PIC to power all of its 32 channels (in some embodiments the splitting factor is higher (e.g., 1:4 or 1:8), to reduce the fiber count). Each channel is carried on a separate fiber, for a total of 32 fibers; in some embodiments, there is no multiplexing of wavelengths (of the unmodulated laser light) on the same fiber. In other embodiments, unmodulated light at multiple wavelengths may be multiplexed onto a single fiber (to reduce the fiber count), using a multiplexer in the laser module 125 and a demultiplexer on the transmit PIC. The fibers are connectorized via an MPO-32 connector. The laser module 125 is connected with a short patch cable (or "loopback" fiber cable 150 (FIGS. 1 and 5)), which may be connected to the optical interface (e.g., an optical connector) at the second end of the laser module 125) to a corresponding power input optical connector (e.g., an MPO connector) on the faceplate, which routes the input fibers carrying unmodulated light to the associated pair of optical engines. In some embodiments, the EAMs are polarization independent, and the fibers need not be polarization maintaining (or "polarization preserving").

The laser module 125 also includes two control ICs, one per engine, which, as mentioned above, provide control and management functionality. These control ICs may implement a management interface, e.g., in compliance with the Common Management Interface Specification (CMIS) which superseded the SFF specification. FIG. 2 is a mechanical drawing of a laser module 125, including a close-up of the flip-chipped laser assembly with 32 lasers (on 8 chips, each chip having four lasers, at four different wavelengths). The four wavelengths may have a nominal wavelength spacing of 20 nm (or, in some embodiments, of 4.5 nm, 0.8 nm, 0.4 nm, or 0.2 nm). The laser module 125 may use power from a 2.5 V power supply. The low data rate electrical connection between the laser module 125 and optical engine 120 may be through the electrical connections on the pluggable laser module 125, across the motherboard 145, and through the package of the optical-electronic switch module 110 to the optical engine connector. The laser module 125 may include a thermo-electric cooler (TEC) to regulate the temperature of the lasers.

In some embodiments, the lasers are III-V N-type distributed feedback lasers (DFB). The laser diodes are arranged in an array of 32 (e.g., 8 laser chips each including 4 lasers) onto a common PIC. The monitoring photodiodes (MPDs) (which may be present on one or more additional separate photodiode chips on the PIC, each of the photodiode chips having an array of photodiodes) are integrated onto the same PIC. FIG. 4 shows a block diagram of a laser module 125, including the control and host interface.

Figure 5A:
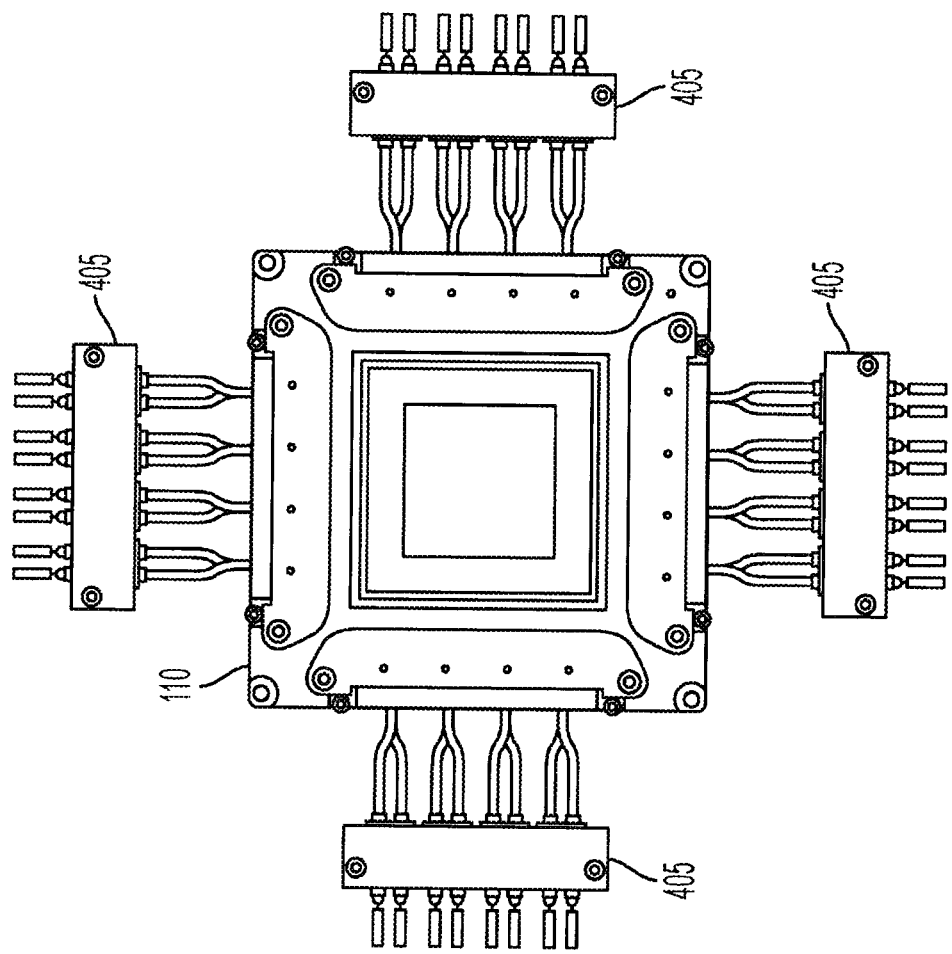
FIG. 5A is a top view of a co-packaged optics switch module with mid-board fiber-to-fiber connectors, according to an embodiment of the present disclosure.
Figure 5B:
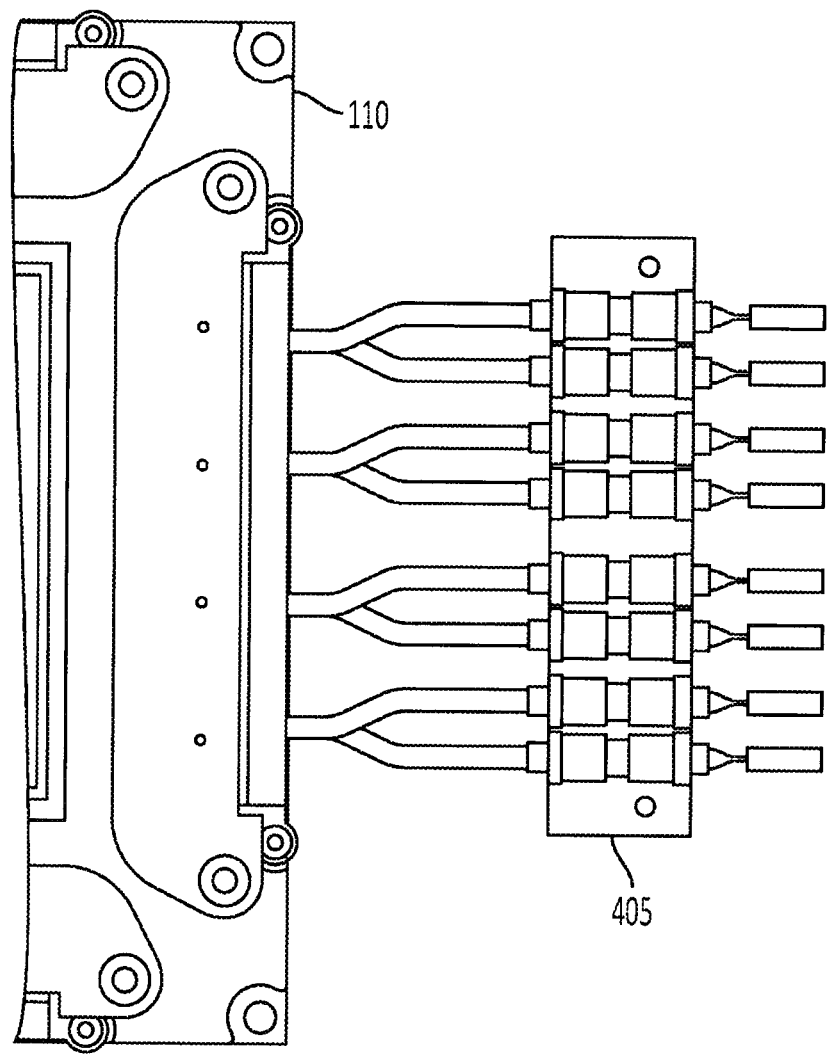
FIG. 5B is an enlarged view of a portion of FIG. 5A.

FIG. 5A depicts fiber management, in some embodiments. Each edge of the optical-electronic switch module 110 accommodates a total of 128 fibers: 32 fibers per engine, including 16 data fibers (8 transmit, 8 receive) and 16 input fibers for unmodulated laser light (each of the input fibers being connected to a 1:2 power splitter on the PIC of the optical engine 120). The chassis includes a mid-board connector 405 for each of the four edges of the optical-electronic switch module 110. Each mid-board connector 405 may be a one-to-one connector, or it may be a connector that rearranges (or "swizzles") and combines the fiber pigtail ribbons from the engines to fiber cables that are routed to the faceplate. The chassis includes four bundles (or "fiber cables"), of 16 power fibers each, for each of the four edges of the optical-electronic switch module edge. Each such fiber cable is attached to two optical power input MPO-32 connectors on the faceplate. Each of the 32-fiber cables that carries optical power from an MPO-32 connector on the faceplate is split into two 16-fiber cables, each of which delivers unmodulated light to a respective optical engine 120. The data fibers are combined into four cables of 16 fibers (8 fiber pairs, each fiber pair having one fiber for outgoing data (TX) and one fiber for incoming data (RX)). Each of the data fibers may connect to an MPO-16 connector on the faceplate. Each mid-board connector 405 may be a two-sided MPO-type connector, which may incur a loss of less than 0.5 dB. FIG. 5B shows an enlarged view of a fan out arrangement for connecting fiber pigtails of optical engines 120 via fiber ribbons to a mid-board connector 405 or "MPO adapter block", and to the faceplate via 16-fiber round cables.

Figure 6:
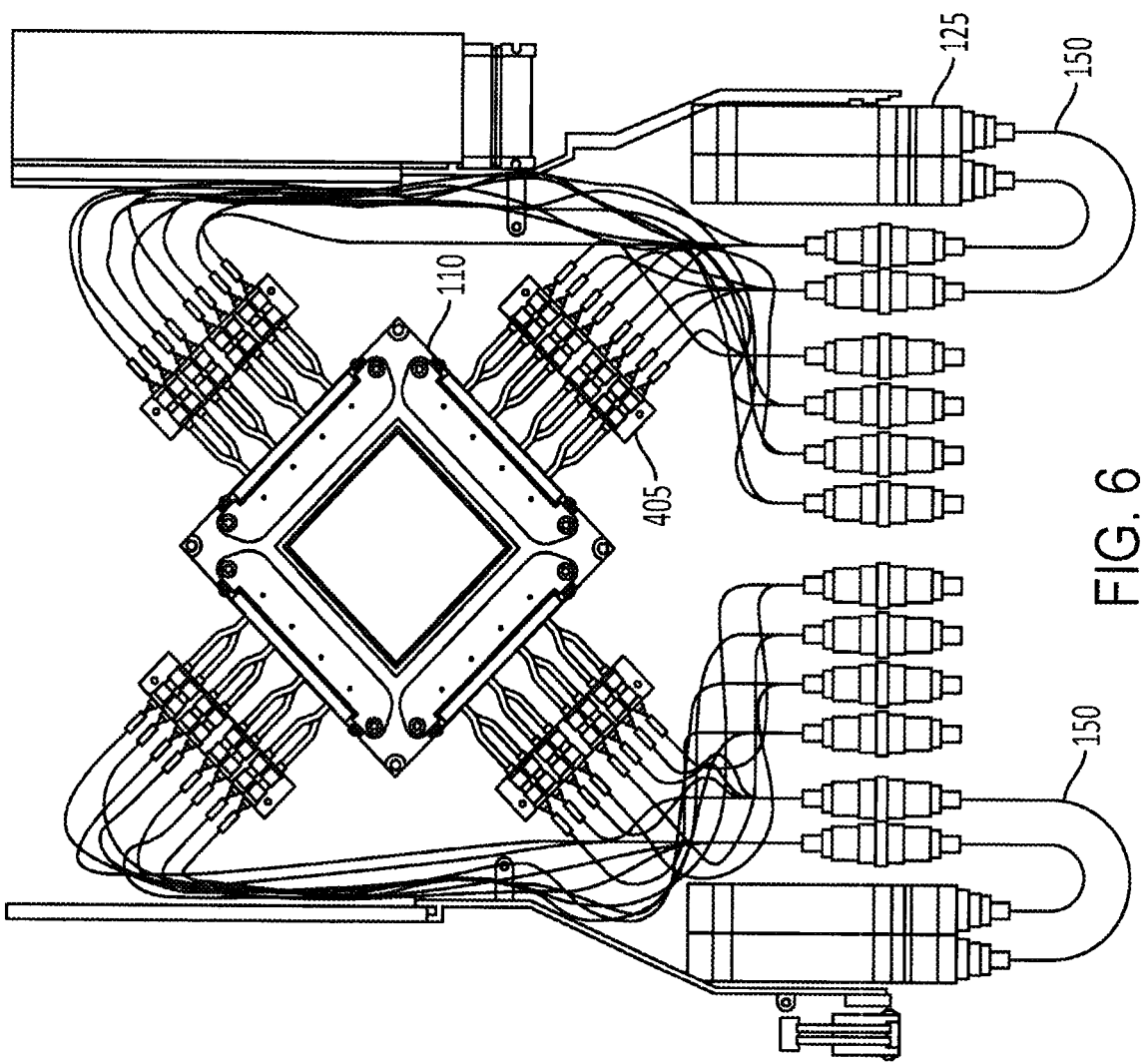
FIG. 6 is a top view of some elements of a chassis, according to an embodiment of the present disclosure.

FIG. 6 shows the layout of the principal components, in some embodiments. The rectangular (e.g., square) optical-electronic switch module 110 may be oblique to the enclosure 105, which may be rectangular (e.g., square). In some embodiments the optical-electronic switch module 110 is oriented at about 45 degrees (e.g., between 30 degrees and 60 degrees) with respect to the enclosure 105. This orientation may help to avoid the presence of fiber cables running primarily transverse to (and thereby blocking) the air flow through the enclosure 105.

As used herein, the term "rectangle" includes a square as a special case, so that something that is square is also "rectangular". Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

Various components described herein (e.g., the switch ASIC, or the microcontroller of a laser module 125) may be portions of one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a faceplate pluggable remote laser source have been specifically described and illustrated herein, many modifications and variations will be apparent to those skilled in the art. Accordingly, it is to be understood that a faceplate pluggable remote laser source constructed according to principles of this disclosure may be embodied other than as specifically described herein. The invention is also defined in the following claims, and equivalents thereof.

What is claimed is:

1. A system, comprising:
an enclosure having a faceplate;
a first optical connector, in the faceplate;
a laser module; and
a loopback fiber cable, connected between the laser module and the first optical connector,
the faceplate forming an exterior boundary of the enclosure,
the laser module having a first end comprising an electrical interface, and a second end comprising an optical interface,
the first end of the laser module being engaged in a receptacle in the faceplate,
the second end of the laser module extending outside the faceplate,
the laser module being configured to receive electrical power through the electrical interface, and to produce unmodulated light at the optical interface,
the loopback fiber cable and the first optical connector being configured to route the unmodulated light back into the enclosure.

2. The system of claim 1, wherein the laser module has a QSFP-DD form factor.

3. The system of claim 1, wherein the first optical connector is a Multi-fiber Push On connector.

4. The system of claim 1, wherein the optical interface of the laser module comprises a second optical connector, the second optical connector being a Multi-fiber Push On connector.

5. The system of claim 1, wherein the loopback fiber cable comprises an optical fiber, the optical fiber not being a polarization-maintaining fiber.

6. The system of claim 1, further comprising an optical-electronic switch module in the enclosure, the optical-electronic switch module comprising a plurality of optical engines, each of the optical engines being configured:
to convert optical data signals to electrical data signals, and
to convert electrical data signals to optical data signals.

7. The system of claim 6, wherein the laser module comprises a laser, and wherein the system further comprises an optical path from the laser of the laser module to an optical modulator of an optical engine of the plurality of optical engines, the optical path lacking an optical isolator.

8. The system of claim 6, wherein the optical-electronic switch module is rectangular, and the optical-electronic switch module is oblique to the enclosure.

9. The system of claim 8, wherein the optical-electronic switch module is at an angle of about 45 degrees relative to the enclosure.

10. The system of claim 6, wherein an optical fiber path between the optical-electronic switch module and the faceplate comprises a second optical connector, inside the enclosure.

11. The system of claim 10, wherein a plurality of optical fiber paths, including the optical fiber path, between the optical-electronic switch module and the faceplate comprise a shared optical connector.

12. The system of claim 1, wherein the laser module comprises a control circuit, comprising:

a circuit for supplying a drive current to a laser of the laser module,
an amplifier for amplifying a signal from a monitoring photodiode in the laser module,
a temperature sensing circuit,
a built-in self-test circuit, and
a microcontroller.

13. A system, comprising:
an enclosure having a faceplate;
an optical-electronic switch module in the enclosure; and
a plurality of laser modules connected to the optical-electronic switch module through optical fibers,
wherein the optical-electronic switch module comprises:
　a switch integrated circuit; and
　a plurality of optical engines, co-packaged with the switch integrated circuit,
wherein a first optical engine of the plurality of optical engines is configured:
　to convert optical data signals to electrical data signals; and
　to convert electrical data signals to optical data signals, using light from a first laser module of the plurality of laser modules,
wherein the optical-electronic switch module further comprises a plurality of fiber cables for receiving optical data signals, for receiving unmodulated light, and for transmitting optical data signals, each of the fiber cables comprising a plurality of optical fibers, and each of the fiber cables terminating in a fiber connector,
the system further comprising a mid-board connector in the enclosure for connecting a plurality of the fiber cables of the optical-electronic switch module to a plurality of fiber cables extending to the faceplate.

14. A system, comprising:
an enclosure having a faceplate;
an optical-electronic switch module in the enclosure;
a plurality of laser modules connected to the optical-electronic switch module through optical fibers;
a first optical connector in the faceplate; and
a loopback fiber cable,
wherein the optical-electronic switch module comprises:
　a switch integrated circuit; and
　a plurality of optical engines, co-packaged with the switch integrated circuit
wherein a first optical engine of the plurality of optical engines is configured:
　to convert optical data signals to electrical data signals; and
　to convert electrical data signals to optical data signals, using light from a first laser module of the plurality of laser modules wherein:
　　a first end of the first laser module is engaged in a receptacle in the faceplate;
　　a second end of the first laser module extends outside the faceplate;
　　the first laser module is configured to produce unmodulated light at the second end of the first laser module; and
　　the loopback fiber cable and the first optical connector are configured to route the unmodulated light back into the enclosure.

* * * * *